United States Patent
Dortschy et al.

(10) Patent No.: US 12,550,083 B2
(45) Date of Patent: Feb. 10, 2026

(54) MUTING PATTERN SIGNALING IN IAB INTER-NODE MEASUREMENT

(71) Applicant: TELEFONAKTIEBOLAGET L M ERICSSON (PUBL), Stockholm (SE)

(72) Inventors: Boris Dortschy, Hägersten (SE); Erik Dahlman, Stockholm (SE); Yezi Huang, Täby (SE); Lei Bao, Gothenburg (SE); Behrooz Makki, Pixbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 433 days.

(21) Appl. No.: 17/608,229

(22) PCT Filed: Apr. 24, 2020

(86) PCT No.: PCT/IB2020/053897
§ 371 (c)(1),
(2) Date: Nov. 2, 2021

(87) PCT Pub. No.: WO2020/225639
PCT Pub. Date: Nov. 12, 2020

(65) Prior Publication Data
US 2022/0256485 A1    Aug. 11, 2022

Related U.S. Application Data

(60) Provisional application No. 62/843,030, filed on May 3, 2019.

(51) Int. Cl.
*H04W 56/00* (2009.01)
*H04B 7/155* (2006.01)
(Continued)

(52) U.S. Cl.
CPC ...... *H04W 56/001* (2013.01); *H04B 7/15542* (2013.01); *H04L 5/0035* (2013.01);
(Continued)

(58) Field of Classification Search
CPC ... H04W 56/001; H04W 24/10; H04W 88/14; H04B 7/15542; H04L 5/0035; H04L 5/0048; H04L 5/0053
See application file for complete search history.

(56) References Cited

U.S. PATENT DOCUMENTS

| 2019/0132862 A1 | 5/2019 | Jeon et al. |
| 2020/0205102 A1* | 6/2020 | Islam ............ H04W 24/10 |

(Continued)

FOREIGN PATENT DOCUMENTS

| CN | 102438209 A | 5/2019 |
| TW | 201838468 A | 10/2018 |

OTHER PUBLICATIONS

Qualcomm Incorporated: Extensions of SSBs for inter-IAB-node discovery and measurements11 , 3GPP Draft; R11902990 7.2.3.2 Extensions of SSBS for Inter-IAB-Node Discovery and Measurements, 3rd Generation Partnership Project (3GPP), Mobile Competence Centre ; 650, Route Des Lucioles , F-06921, vol. RAN WG1, No. Athens, Greece; Feb. 25, 2019-Mar. 16, 2019-Mar. 1, 2019 Feb. 16, 2019 (Feb. 16, 2019), XP051600687.
(Continued)

*Primary Examiner* — Omer S Mian
(74) *Attorney, Agent, or Firm* — Sage Patent Group

(57) ABSTRACT

In one aspect, a wireless relay node operating in a wireless communications network obtains (602), for each of one or more other wireless relay nodes, information indicating a muting pattern for muting of synchronization signal blocks, SSBs, by the other wireless relay node. The wireless relay
(Continued)

| SMTC | Muting condition |
|---|---|
| SMTC 1 | IAB node 1: M1<br>IAB node 2: M1<br>IAB node 3: M0 |
| SMTC 2 | IAB node 2: M1<br>IAB node 4: M1<br>IAB node 1: M0<br>IAB node 3: M0 |
| SMTC 3 | IAB node 3: M1<br>IAB node 5: M1<br>IAB node 2: M0<br>IAB node 4: M0 | node performs (604) measurements of SSBs and muting of SSB transmissions based on the obtained information.

11 Claims, 11 Drawing Sheets

(51) Int. Cl.
*H04L 5/00* (2006.01)
*H04W 24/10* (2009.01)
*H04W 88/14* (2009.01)

(52) U.S. Cl.
CPC .......... *H04L 5/0048* (2013.01); *H04L 5/0053* (2013.01); *H04W 24/10* (2013.01); *H04W 88/14* (2013.01)

(56) References Cited

U.S. PATENT DOCUMENTS

| | | | |
|---|---|---|---|
| 2021/0298000 A1* | 9/2021 | Park | H04L 5/0098 |
| 2021/0345321 A1* | 11/2021 | Wu | H04W 16/10 |
| 2022/0061010 A1* | 2/2022 | Harada | H04W 56/001 |
| 2022/0141686 A1* | 5/2022 | Korhonen | H04L 5/0048 370/252 |

OTHER PUBLICATIONS

CMCC: Discussions on extensions of SSBs for inter-JAB-node discovery and measurements11, 3GPP Draft; RI-1902328, 3rd Generation Partnership Project (3GPP), Mobile Competence Centre; 650, Route Des Lucioles ; F-06921 Sophia-Antipolis Cedex ; France, vol. RAN WGI, No. Athens, Greece; Feb. 25, 2019-Mar. 1, 2019 Feb. 16, 2019 (Feb. 16, 2019), XP051600022.

Ericsson : SBB-based IAB Node Discover and measurement11 , 3GPP Draft; RI-1904832, 3rd Generation Partnership Project (3GPP), Mobile Competence Centre ; 650, Route Des Lucioles ; F-06921 Sophia-Antipolis Cedex ; France , No. Xi 'an, China; Apr. 8, 2019-Apr. 12, 2019 Apr. 7, 2019 (Apr. 7, 2019), XP051699979.

* cited by examiner

| SMTC | Muting condition |
|---|---|
| SMTC 1 | IAB node 1: M1<br>IAB node 2: M1<br>IAB node 3: M0 |
| SMTC 2 | IAB node 2: M1<br>IAB node 4: M1<br>IAB node 1: M0<br>IAB node 3: M0 |
| SMTC 3 | IAB node 3: M1<br>IAB node 5: M1<br>IAB node 2: M0<br>IAB node 4: M0 |

*FIG. 4*

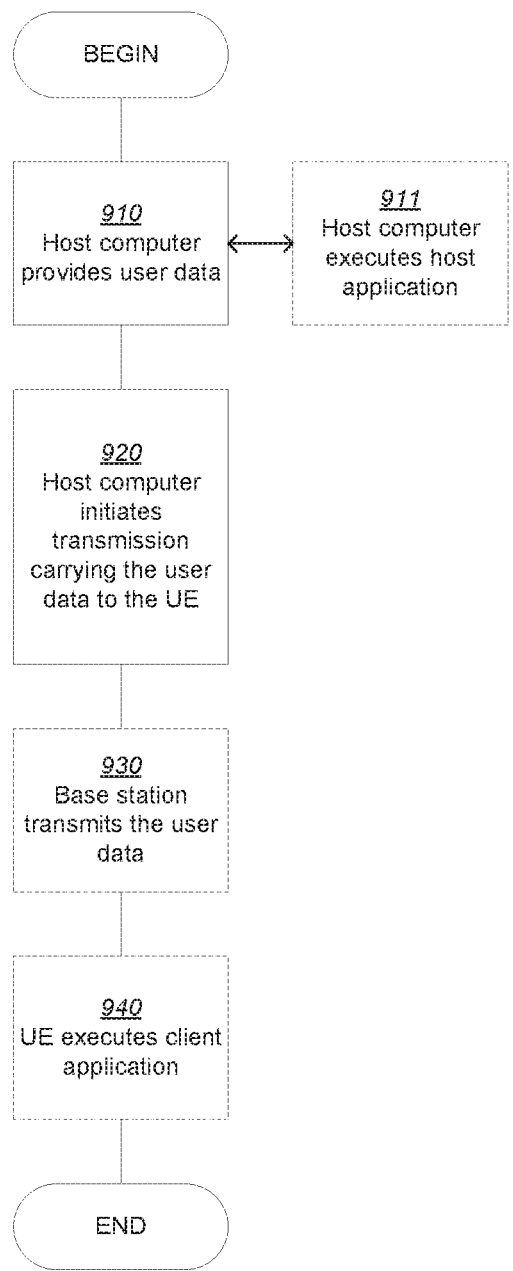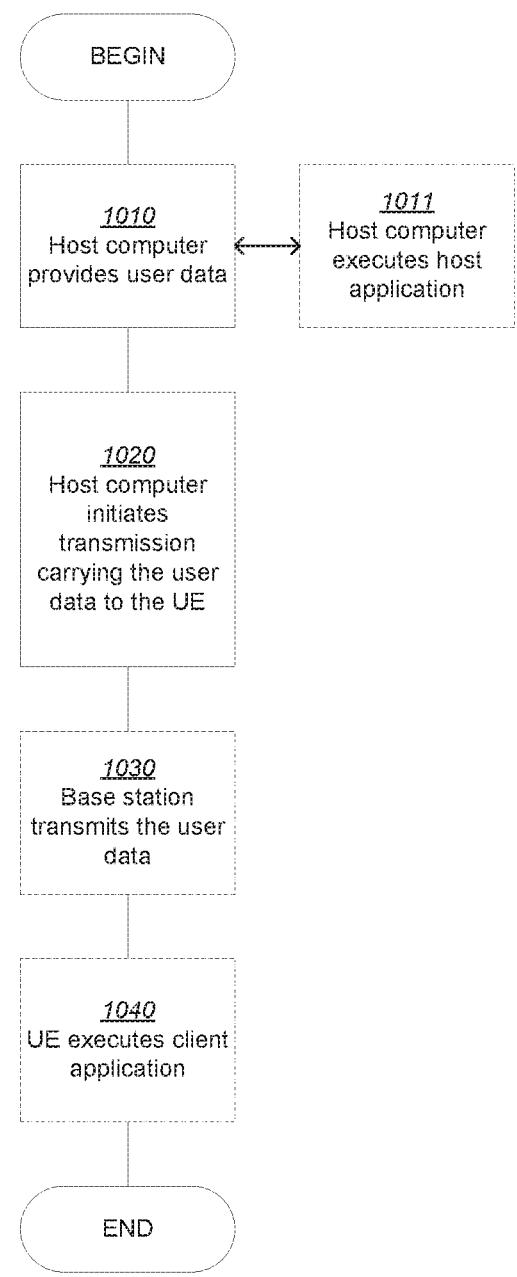
*FIG. 9*  *FIG. 10*

MUTING PATTERN SIGNALING IN IAB INTER-NODE MEASUREMENT

This application is a 371 of International Application No. PCT/IB2020/053897, Apr. 24, 2020, which claims the benefit of U.S. Provisional Application No. 62/843,030, filed May 3, 2019, the disclosures of which are fully incorporated herein by reference.

TECHNICAL FIELD

The present disclosure generally relates to the field of wireless network communications, and more particularly, to a first wireless relay node operating in a wireless communications network.

BACKGROUND

Integrated Access and Backhaul (IAB) is to be introduced in New Radio (NR) release 16 to provide flexible and dense deployment of NR cells without densifying the transport network proportionately. FIG. 1 gives an example of an IAB deployment in which multiple IAB nodes are wirelessly connected. The IAB donor node provides user equipments (UEs) an interface to the core network and wireless backhauling functionality to IAB nodes. An IAB node is a radio access network (RAN) node that supports wireless access to UEs and/or other IAB nodes and wirelessly backhauls the access traffic. Each IAB node, as well as the IAB donor node, creates one or multiple cells to which UEs, as well as other IAB nodes, can connect.

In general, within NR, the transmission from the cell site of so-called synchronization signal (SS)/physical broadcast channel (PBCH) blocks (SSBs) are used by UEs to initially find a cell to connect to or discover and measure on neighbor cells. The SS periodicity can take different values. Within one period, the SSBs are transmitted in a burst. The maximum number (L) of SSBs in one burst (confined in one half frame) is determined by the carrier frequency. For a frequency range from 6 GHz to 52.6 GHz, L=64.

An SSB is transmitted over four consecutive Orthogonal Frequency Division Multiplexing (OFDM) symbols and includes three parts: a primary synchronization signal (PSS) from which a UE can synchronize in time and frequency to the cell transmitting the SSB; a secondary synchronization signal (SSS) from which a UE can acquire the physical cell identity (PCI) of the cell transmitting the SSB; and a Physical Broadcast Channel (PBCH) that includes a very limited amount of system information that a UE needs before it can connect to the cell. The main part of this information is included in what is known as the Master Information Block (MIB).

With the introduction of IAB in NR Release 16, it is expected that IAB nodes will use SSBs transmitted from IAB donor nodes or other IAB nodes to find cells to access and for neighbor-cell discovery/measurements. There are two SSB-based solutions for IAB inter-node measurement that take into account the half-duplex constraint at an IAB-node and multi-hop topologies.

—Extract from 3GPP TR 38.874—
SSB-Based Solutions (Solution 1-A and 1-B):
  Solution 1-A) Reusing the same set of SSBs used for access UEs:
    In this case, the SSBs for inter-IAB cell search in stage 2 are on the currently defined sync raster for a SA frequency layer, while for an NSA frequency layer the SSBs are transmitted inside of the SMTC configured for access UEs.
  Solution 1-B) Use of SSBs which are orthogonal (TDM and/or FDM) with SSBs used for access UEs:
    In this case, the SSBs, that may get muted, for inter-IAB cell search and measurement in stage 2 are not on the currently defined sync raster for a SA frequency layer, while for a NSA frequency layer the SSBs are transmitted outside of the SMTC configured for access UEs.
  An IAB-node should not mute its own SSB transmissions targeting UE cell search and measurement when doing inter-IAB cell search in stage 2:
  For SA, this means that SSBs transmitted on the currently defined sync raster follow the currently defined periodicity for initial access;
  In case of Solution 1-B, this implies SSBs, that may get muted, for inter-IAB stage 2 cell search is at least TDM with SSBs used for UE cell search and measurements.
—End Extract from 3GPP TR 38.874—

Solution 1-A, which uses the on-raster SSBs, is already supported by the current Release 15 specification. As agreed in 3GPP TR 38.874, additional flexibility in SSB configuration can be introduced to the off-raster SSBs used in Solution 1-B for example, to allocate additional time-domain positions on a channel raster for SSB transmission. One option is to support transmission of off-raster SSBs in any half-frame and within multiple half frames.

In an IAB node, the logical unit that terminates the backhaul radio interface toward the IAB parent node is in 3GPP sometimes referred to as the Mobile-Termination (MT) part of the IAB node. The IAB function that establishes RLC connection to MTs of the IAB child nodes and UEs is in 3GPP sometimes referred to as the Distributed Unit (DU) part of the IAB node. Likewise, when it comes to SSB based measurements, they are carried out by what is sometimes referred to as the MT part of the IAB node. The transmissions of SSBs are carried out by what is sometimes referred to as the DU part of the IAB node.

In parallel with SSB transmission by the DU, UEs and MTs are configured to search for and measure on SSBs at specific time instances. The DU and MT should be jointly configured to enable inter-node SSB measurements, while not violating the half-duplex constraint.

In Release 15, a UE will be provided with measurement information such as: the frequency domain location of SSBs; the time domain measurement window (SMTC); and the SS indices in a burst. According to current agreements, the SSBs for IAB inter-node discovery and measurements are defined with a framework using the characteristics of the Release 15 measurement timing configuration for SSB based radio resource management (SMTC) framework, and SSB transmission configurations (STC) indicating SSB transmissions will be introduced.

SUMMARY

Several challenges have been identified regarding inter-node measurements in an IAB network. First, due to the half-duplex constraint, an IAB node cannot transmit and measure SSBs at the same time. To enable inter-node measurement in an IAB network, the IAB nodes may need different time-domain SSB transmission patterns that provide timewise orthogonal opportunities for SSB measurements. From the detectability point of view, each node should have somewhat orthogonal time-domain transmission and reception patterns. However, a large number of non-overlapping patterns will require many SMTC windows and it has been agreed that the maximum number of SMTC windows that can be configured for an IAB node is 4. Determining how to efficiently measure multiple IAB nodes with a limited number of SMTC windows is a complex optimization problem.

Muting SSB transmission could be one solution if there is a collision between SSB transmission and measurement, but muting SSB transmission by a certain IAB node may have a negative impact on other nodes that are currently measuring this IAB node. The impact of muting needs to be limited. One solution is to prioritize SSB transmission or measurement when there is a collision, by an IAB internal decision. This means that, in principle, an IAB node can mute any SSB transmission when it is time-wise overlapped with SSB measurement.

If an IAB node has no information about muting configurations of other IAB nodes, it is difficult for an IAB node to make a proper decision on how many and which SSBs to mute by itself. The techniques described herein provide a method for an IAB node to acquire knowledge about muting conditions in relation to other IAB nodes in the network. According to an aspect, muting pattern related information can be communicated to and about IAB nodes involving a network function in order to enable and/or improve coordination of node muting decisions.

According to some embodiments, a method, in a first wireless relay node operating in a wireless communications network, includes obtaining, for each of one or more other wireless relay nodes, information indicating a muting pattern for muting of synchronization signal blocks (SSBs) by the other wireless relay node. The method also includes performing measurements of SSBs and muting of SSB transmissions based on the obtained information.

Further aspects of the present invention are directed to an apparatus, network node, base station, wireless relay node, network devices, computer program products or computer readable storage medium corresponding to the methods summarized above and functional implementations of the above-summarized wireless relay node.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 4 illustrates an example of an internal muting table, according to some embodiments.

FIGS. 9 to 12 are flowcharts illustrating example methods implemented in a communication system including a host computer, a base station and a user equipment.

DETAILED DESCRIPTION

Figure 1:
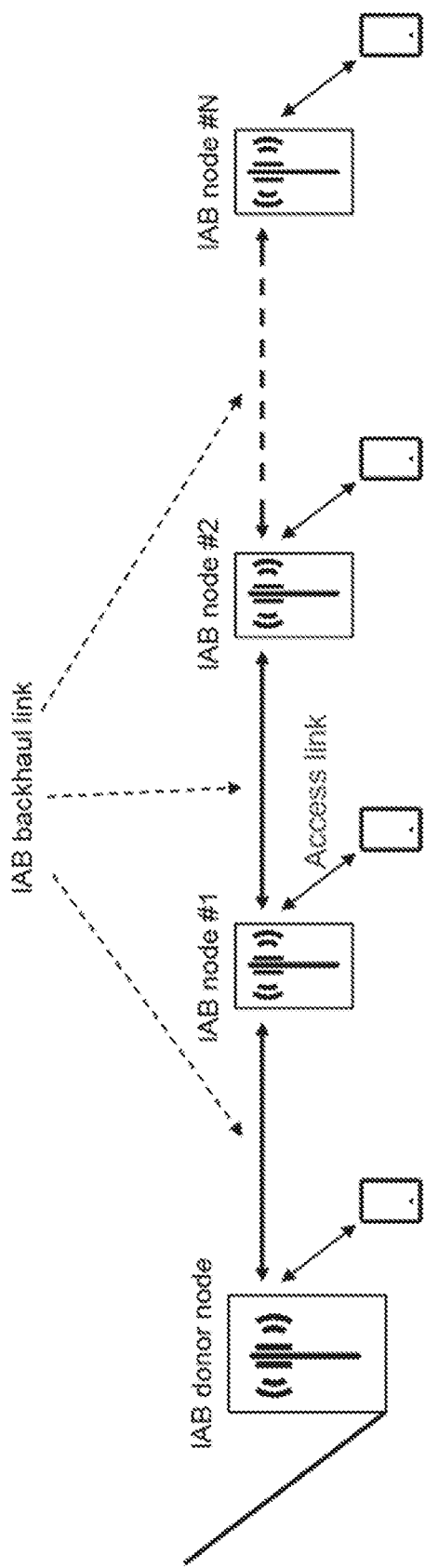
FIG. 1 illustrates an example of an IAB network.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The embodiments are described with respect to NR, but can be adapted in other radio access technologies where the techniques or selections may be relevant.

If an IAB node has no information about muting configurations of other IAB nodes, it is difficult for an IAB node to make a proper decision on how many and which SSBs to mute. The embodiments described herein provide a method for an IAB node to acquire knowledge about muting conditions in relation to other IAB nodes in the network. According to an aspect, muting pattern related information can be communicated to and about IAB nodes involving a network function (NF) in order to enable and/or improve coordination of node muting decisions.

SSB transmission and measurement configurations for inter-node measurements may be determined in a centralized manner. An NF may be a function that provides and/or coordinates configurations for SSB transmission and measurement. The NF may be part of a node in the RAN or a separate function residing in the core network. The NF function may be a sub-functionality in an overall IAB Operations. Administration and Maintenance (OAM) system, where an OAM client in the IAB node may control the MT and/or DU behavior. The NF function may also be at a node in the RAN (for example an IAB donor, or an IAB-CU), or as a separate function residing in the core network (for example the OAM function).

An IAB-DU may be configured with zero, one or multiple STCs to transmit Type-1B node-measurement (NM) SSBs, and at least the following information may be provided in each STC: SSB center frequency; SSB subcarrier spacing; SSB transmission periodicity; SSB transmission timing offset in half frame(s); and the index of SSBs to transmit.

In the IAB case, the DU and MT configuration of STC (SSB Transmission Configuration) and configuration of Measurement Objects (MeasObj) and SMTC (SS/PBCH measurement time configuration) should be given in a coordinated manner to enable inter-node SSB measurements while not violating the half-duplex constraint. Potential collision between STC and SMTC time locations should be handled. When there is a collision, it is an IAB internal decision to prioritize SSB transmission or measurement based on diverse performance requirements and other conditions. This means that an IAB node may mute any IAB NM-SSB when there is a time domain collision between STC and SMTC configurations.

The resulting situation will be that the network, i.e., the aggregate or part of RAN, core network and/or OAM, has no information about which SSB transmission will be muted by each IAB node. Each IAB node has no information about whether there will be any SSB transmitted or not during a certain SMTC window (due to muting). The node has also no information about how many and which other IAB nodes it can measure in different SMTC windows. Given these uncertainties, an IAB node may not make a proper muting decision, especially if collision between SSB transmission and measurement occurs in multiple time locations.

Figure 2:
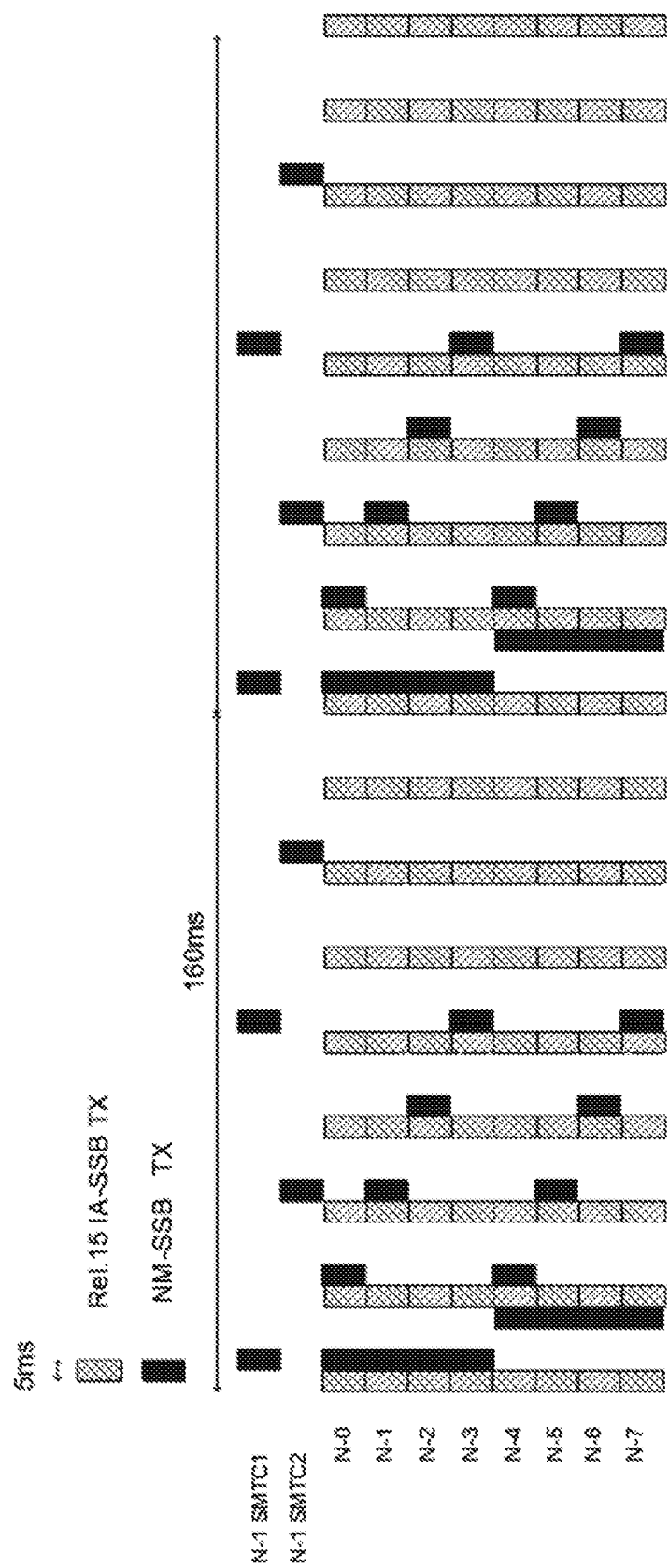
FIG. 2 illustrates an example of collision between SSB transmission and measurement during IAB inter-node measurement.

FIG. 2 provides a simple example to illustrate multiple collisions between SSB transmission and measurement. The eight IAB nodes (N0-N7) are configured with partially overlapping time slots for transmitting NM-SSBs, represented with the solid boxes. These NM-SSBs are time-wise orthogonal to Release 15 initial access (IA) SSBs, represented with the diamond grid boxes. In addition, an IAB node N1 is configured with two SMTCs of the same periodicity (80 ms), but different time offsets. Thus, N1 can measure SSBs in 4 time slots within 160 ms, and 2 of the 4 time slots coincide with the SSB transmission windows. To fulfill certain measurement requirements, IAB N1 may need to mute some SSB transmissions. A coordinated decision on which SSBs should be muted could often outperform a blind decision.

Figure 3:
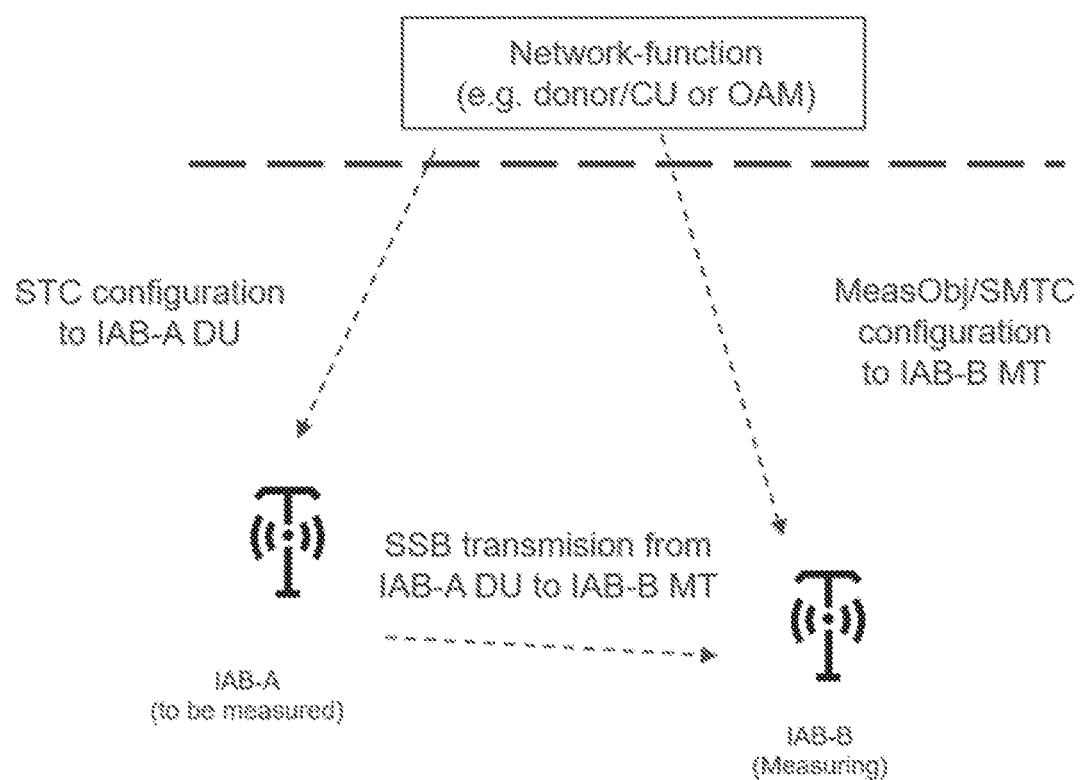
FIG. 3 illustrates an exchange of muting related information between the Network-function and IAB nodes, according to some embodiments.

In order for an IAB-node to make a good muting decision, muting related information should be exchanged between a coordinating and providing Network-Function, IAB nodes performing measurements and the IAB node to be measured. In FIG. 3, the IAB node that will be measured is denoted as IAB-A, and the SSB transmission is carried out by the DU part of an IAB node (IAB-DU). Likewise, the IAB node that will perform measurement is denoted as IAB-B. and the SSB measurement is performed by the MT part of an IAB node (IAB-MT). Generally speaking, IAB-DU and IAB-MT should be provided with different information that can be combined to enable muting coordination among multiple nodes.

For the node IAB-A (the IAB-DU perspective), muting-related information can be conveyed in the STC configuration from the NF. In this case, the information is mainly in regard to the IAB-A for its own SSB transmission, namely to determine a subgroup of SSBs that cannot be muted. This decision may be assisted by the NF, since all STCs and SMTCs are configured by the NF that has the best overview of how many and which SSBs each IAB node may detect in different SMTCs. Hence, a muting preference from the NF point-of-view may be very valuable.

An IAB node may be provided with additional STC configuration information regarding the muting property. Besides the already agreed configuration information, in each STC, the IAB-A could also be provided with a muting attribute to indicate whether these SSBs can be muted or not. One attribute may be denoted as M0-STC, indicating that the configured SSBs in this STC shall be transmitted (i.e., cannot be muted). Another attribute may be denoted as M1-STC, indicating that the configured SSBs in this STC do not need to be transmitted if the IAB node has to measure on an SSB transmitted by another node that is time-wise overlapping with the SSB configured for transmission by this STC. For IAB-A, the configuration of M0-STCs can reduce the set of SSBs that are allowed to be muted. In other words, the muting pattern is defined by the combined M1-STCs.

IAB-B MT may be used to perform measurement. For the node IAB-B, the muting-related information will mainly be used to determine how many and which SSBs to mute among all SSBs, which can be muted. For this purpose, there is a need for the node IAB-B to get and have information on the muting patterns of those IAB nodes to be measured. It can be obtained in several ways.

Option 1 is to obtain information from a NF (e.g., through MeasObj/SMTC configuration). For each MeasObj/SMTC, the NF can provide IAB-B with a list of IAB nodes that can be detected within a certain SMTC window, as well as the corresponding muting attributes. In practice, it is neither necessary nor practical to list all IAB nodes that transmit SSBs in the SMTC window. The NF will rather provide information about a few nodes in a measurement request to IAB-B.

Option 2 is to obtain information from other IAB nodes (e.g., indicated in SSB). For the node IAB-B, the muting patterns of other nodes, e.g., IAB-A, can also come directly from those nodes. An IAB node may detect more nodes than those requested by the NF. Then, it would be good that muting information is indicated in the detected SSBs. For example, this may be done by using one bit in an SS block (e.g., MIB/PBCH) to indicate whether this is M1-SSB or M0-SSB.

In some embodiments, the node IAB-B can collect information and build up an internal list of muting prioritizations. For example, the list can describe, for each SMTC window, which IAB nodes can be measured and the corresponding muting attribute. FIG. 4 illustrates an example of the list in an internal muting table. In some cases, the IAB internal muting list only documents IAB nodes that are configured with M1-SSBs. In other cases, the IAB internal muting list only documents IAB nodes that are configured with M0-SSBs.

In some embodiments, the STC and MeasObj/SMTC configurations are provided by a part of a node in the RAN or a separate function residing in the core network. The STC and MeasObj/SMTC configurations may also be provided by a sub-functionality in an overall IAB OAM system, where an OAM client in the IAB node may control the MT and/or DU behavior. In some cases, the STC and MeasObj/SMTC configurations are provided by the donor node of the IAB network. In other cases, the STC and MeasObj/SMTC configurations are provided by the CU (Central Unit) of the IAB network. The STC and MeasObj/SMTC configurations may be provided by the OAM function of the network.

In some embodiments, the STC and MeasObj/SMTC configurations are per IAB node or per cell. One IAB node may be configured with multiple cells.

In some embodiments, the NF may provide, in the MeasObj/SMTC configuration, a list of IAB nodes that transmit M1-SSBs in this window. The NF may also provide, in the MeasObj/SMTC configuration, a list of IAB nodes that transmit M0-SSBs in this window.

In some embodiments, the muting option is a property of the STC and may be applied to all the SSBs in the STC. Even though the muting property is for the whole group, the IAB node may apply muting to a subset of SSBs in the HF. The muting option may be assigned to each SSB in one STC.

In some embodiments, to maximize the reuse of the Release 15 specification, the time location of the SS indices in one HF follows the Release 15 specification. The SS indices in one HF may take locations other than those specified in the Release 15 specification.

In some embodiments, the SS-bursts in different STCs have the same indices. In other embodiments, the SS-bursts in different STCs have different indices.

Figure 5:
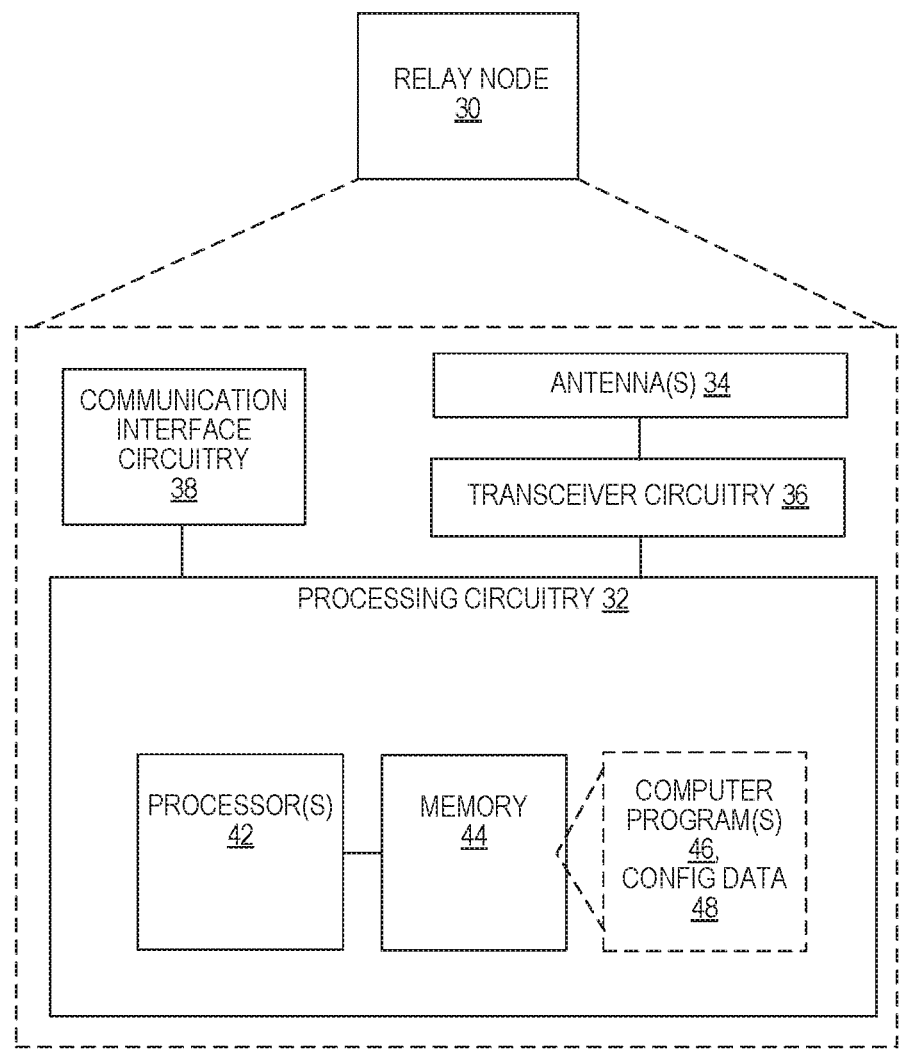
FIG. 5 illustrates is a block diagram of a relay node, according to some embodiments.

FIG. 5 shows an example wireless relay node 30 that may be configured to carry out one or more of these disclosed techniques. Relay node 30 may be a RAN node or base station, such as an evolved Node B (eNodeB), Node B or gNB. While a relay node 30 is shown in FIG. 5, the operations can be performed by other kinds of network access nodes, including a radio network node such as base station, radio base station, base transceiver station, base station controller, network controller, NR BS, Multi-cell/multicast Coordination Entity (MCE), access point, radio access point, Remote Radio Unit (RRU) Remote Radio Head (RRH), or a multi-standard BS (MSR BS). Relay node 30 may also, in some cases, be or be part of a core network node (e.g., MME, SON node, a coordinating node, positioning node, MDT node, etc.), or even an external node (e.g., 3rd party node, a node external to the current network), etc. Relay node 30 may also comprise test equipment.

In the non-limiting embodiments described below, relay node 30 will be described as being configured to operate as a cellular network access node in an NR network. In some embodiments, the technique can be implemented in the RRC layer. The RRC layer could be implemented by one or more network nodes in a cloud environment and hence some embodiments can be implemented in a cloud environment.

Those skilled in the art will readily appreciate how each type of node may be adapted to carry out one or more of the methods and signaling processes described herein, e.g., through the modification of and/or addition of appropriate program instructions for execution by processing circuits 32.

Relay node 30 facilitates communication between wireless terminals (e.g., UEs), other network access nodes and/or the core network. Relay node 30 may include communication interface circuitry 38 that includes circuitry for communicating with other nodes in the core network, radio nodes, and/or other types of nodes in the network for the purposes of providing data and/or cellular communication services. Relay node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Relay node 30 also includes one or more processing circuits 32 that are operatively associated with the transceiver circuitry 36 and, in some cases, the communication interface circuitry 38. Processing circuitry 32 comprises one or more digital processors 42. e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by the network access node 30. Processing circuitry 32 may be configured, e.g., through the use of appropriate program code stored in memory 44, to carry out one or more of the methods and/or signaling processes detailed hereinafter.

Processing circuitry 32 of the relay node 30 is configured, according to some embodiments, to act as a first wireless relay node operating in a wireless communications network. The first wireless relay node is configured to serve one or more wireless devices (e.g., UEs) and/or one or more other relay nodes downstream and provide a wireless backhaul upstream, to a donor base station or another relay node.

Processing circuitry 32 is configured to obtain, for each of one or more other wireless relay nodes, information indicating a muting pattern for muting of synchronization signal blocks (SSBs) by the other wireless relay node. Processing circuitry 32 is also configured to perform measurements of SSBs and muting of SSB transmissions based on the obtained information.

Processing circuitry 32 is also configured to perform method 600, according to some embodiments. Method 600, shown in FIG. 6, includes obtaining, for each of one or more other wireless relay nodes, information indicating a muting pattern for muting of SSBs by the other wireless relay node (block 602) and performing measurements of SSBs and muting of SSB transmissions based on the obtained information (block 604).

In some embodiments, obtaining the information may include receiving the information for each of a plurality of the other wireless relay nodes from a centralized network function, and receiving the information from the centralized network function may include receiving the information in a measurement request sent to the first wireless relay node.

In some embodiments, obtaining the information may include receiving the information for at least one of the other wireless relay nodes from the respective wireless relay node, and receiving the information from the respective wireless relay node may include receiving the information in an SSB received from the respective wireless relay node.

For at least one other wireless relay node, the information indicating the muting pattern may be specific to a cell served by the respective other wireless relay node or may apply to multiple cells served by the respective other wireless relay node.

Figure 7:
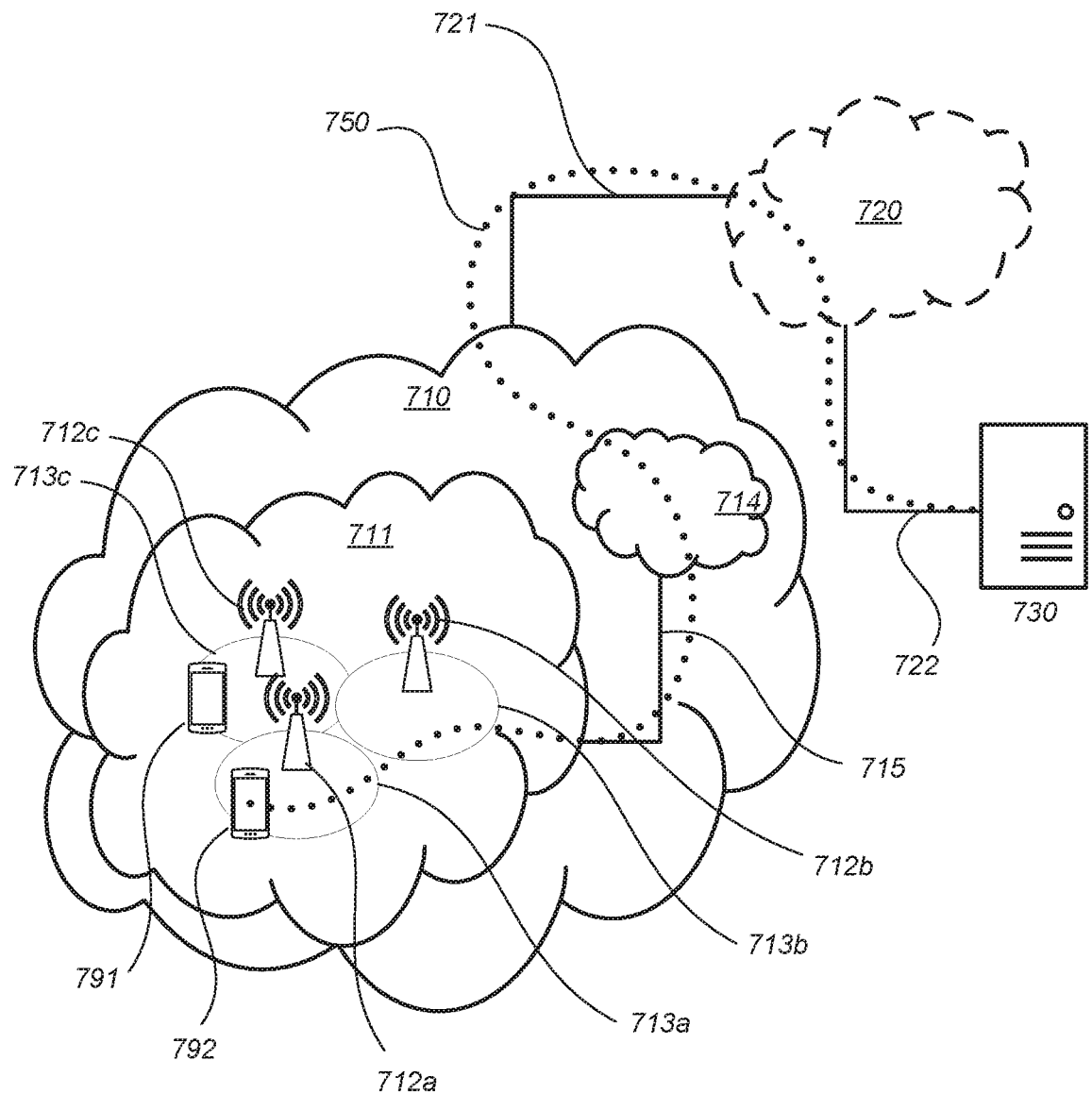
FIG. 7 schematically illustrates a telecommunication network connected via an intermediate network to a host computer, according to some embodiments.

FIG. 7, according to some embodiments, illustrates a communication system that includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a. 712b, 712c is connectable to the core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
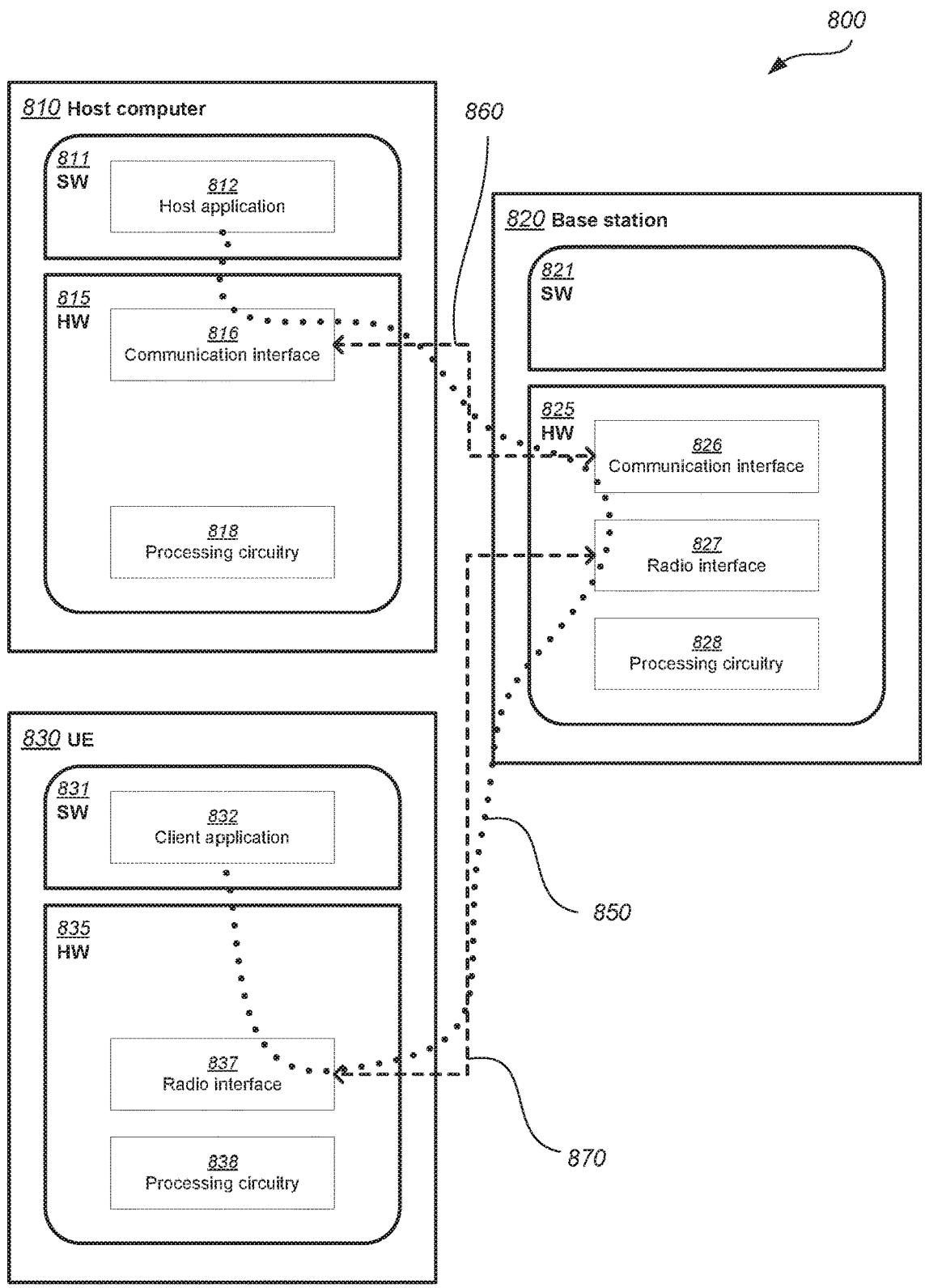
FIG. 8 is a generalized block diagram of a host computer communicating via a base station with a user equipment over a partially wireless connection, according to some embodiments.

It is noted that the host computer 810, base station 820 and UE 830 illustrated in FIG. 8 may be identical to the host computer 830, one of the base stations 812a, 812b, 812c and one of the UEs 891, 892 of FIG. 9, respectively. This is to say, the inner workings of these entities may be as shown in FIG. 8 and independently, the surrounding network topology may be that of FIG. 9.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure, such as provided by nodes such as a wireless device and relay node 30, along with the corresponding methods 600 and 800. The embodiments described herein provide a method for an IAB node to acquire knowledge about muting conditions in relation to other IAB nodes in the network. The main idea is to communicate muting pattern related information to and about IAB nodes involving a network function in order to enable and/or improve coordination on nodes' muting decisions. The teachings of these embodiments may improve the reliability, connections, data rate, capacity, latency and/or power consumption for the network and UE 830 using the OTT connection 850.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

Figures 11, 12:
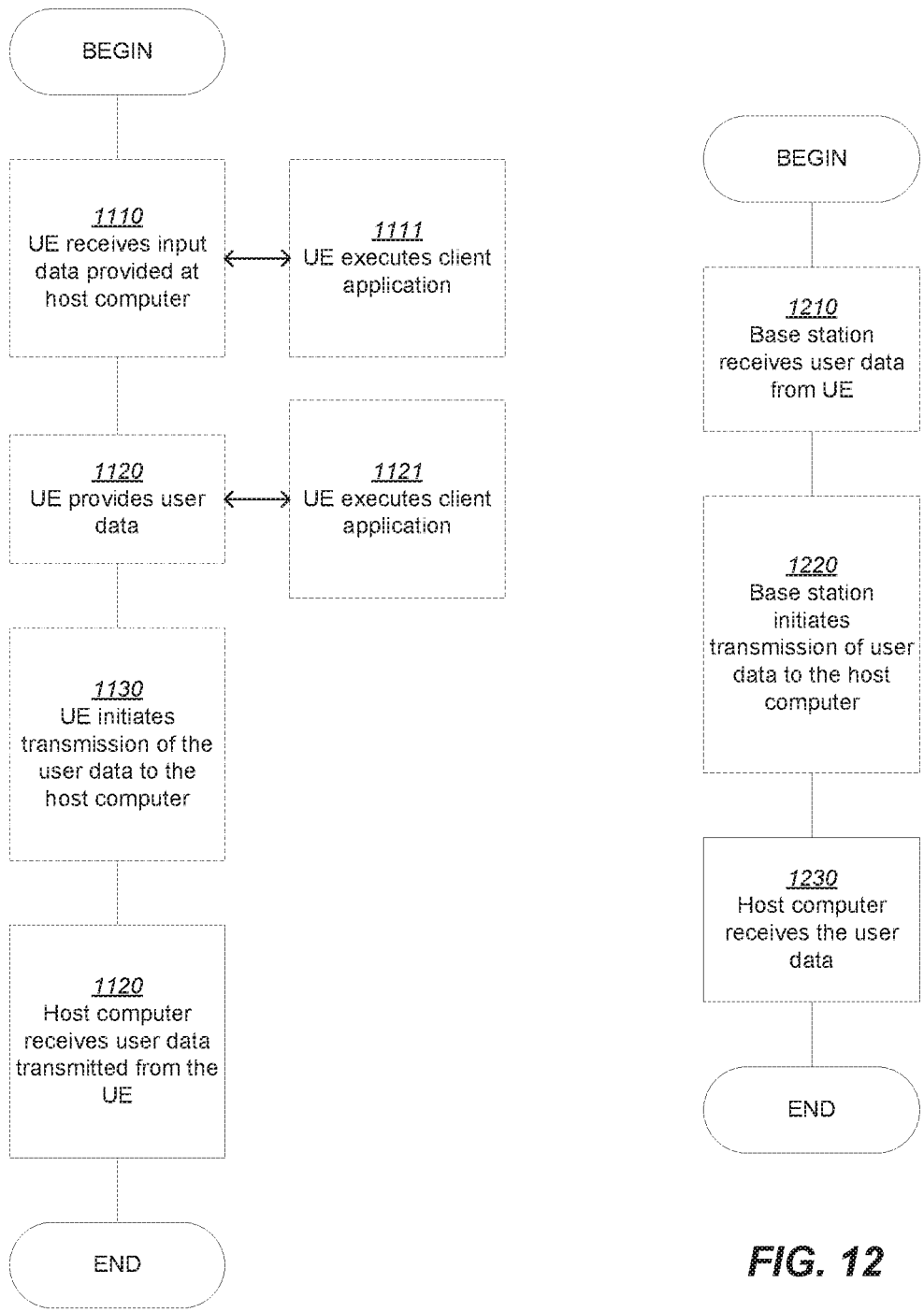

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally, or alternatively, in an optional second step 1120, the UE provides user data. In an optional substep 1121 of the second step 1120, the UE provides the user data by executing a client application. In a further optional substep 1111 of the first step 1110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

Figure 6:
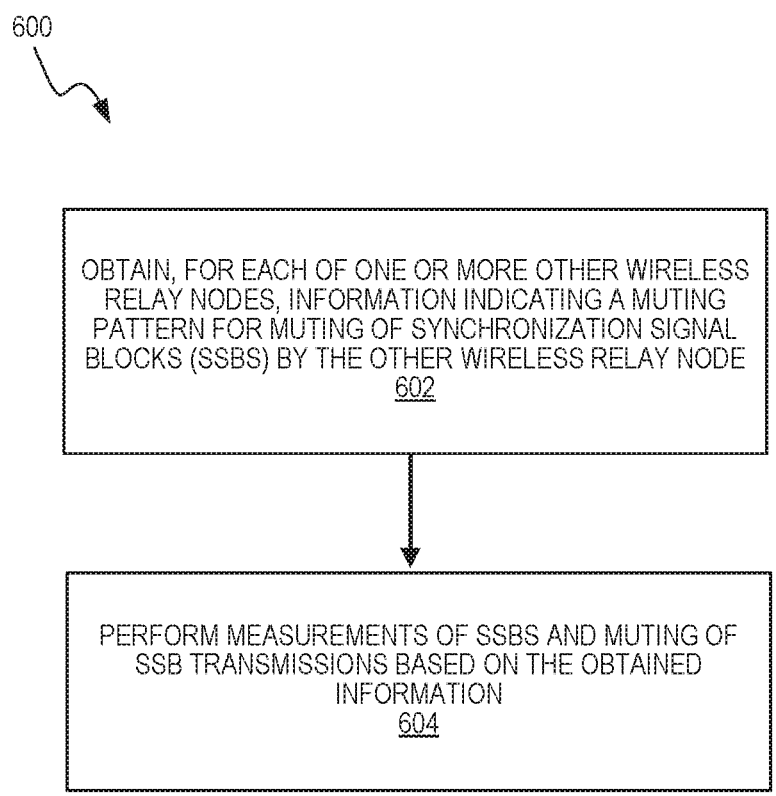
FIG. 6 illustrates a flowchart illustrating a method in the relay node, according to some embodiments.

As discussed in detail above, the techniques described herein, e.g., as illustrated in the process flow diagrams of FIG. 6, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 13:
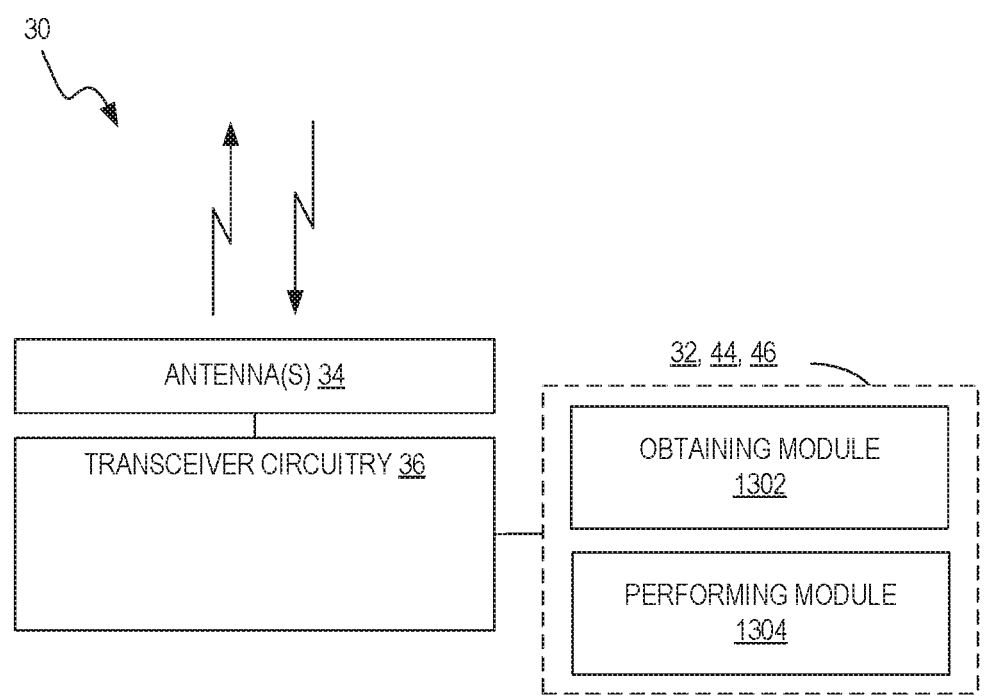
FIG. 13 is a block diagram illustrating a functional implementation of a relay node, according to some embodiments.

FIG. 13 illustrates an example functional module or circuit architecture for a wireless relay node 30. The functional implementation includes a receiving module 1302 for obtaining, for each of one or more other wireless relay nodes, information indicating a muting pattern for muting of SSBs by the other wireless relay node. The implementation also includes a performing module 1304 for performing measurements of SSBs and muting of SSB transmissions based on the obtained information.

EXAMPLE EMBODIMENTS

Example embodiments can include, but are not limited to, the following enumerated examples:

1. A method, in a first wireless relay node operating in a wireless communications network, the method comprising:
   obtaining, for each of one or more other wireless relay nodes, information indicating a muting pattern for muting of synchronization signal blocks (SSBs) by the other wireless relay node; and
   performing measurements of SSBs and muting of SSB transmissions based on the obtained information.
2. The method of example embodiment 1, wherein obtaining the information comprises receiving the information for each of a plurality of the other wireless relay nodes from a centralized network function.
3. The method of example embodiment 2, wherein receiving the information from the centralized network function comprises receiving the information in a measurement request sent to the first wireless relay node.
4. The method of example embodiment 1, wherein obtaining the information comprises receiving the information for at least one of the other wireless relay nodes from the respective wireless relay node.
5. The method of example embodiment 4, wherein receiving the information from the respective wireless relay node comprises receiving the information in an SSB received from the respective wireless relay node.
6. The method of any of example embodiments 1-5, wherein, for at least one other wireless relay node, the information indicating the muting pattern is specific to a cell served by the respective other wireless relay node.
7. The method of any of example embodiments 1-5, wherein, for at least one other wireless relay node, the information indicating the muting pattern applies to multiple cells served by the respective other wireless relay node.
8. A wireless relay node adapted to perform a method according to any of example embodiments 1-7.
9. A wireless relay node comprising transceiver circuitry and processing circuitry operatively associated with the transceiver circuitry and configured to perform a method according to any of example embodiments 1-7.
10. A computer program comprising instructions that, when executed on at least one processing circuit, cause the at least one processing circuit to carry out a method according to any one of example embodiments 1-7.
11. A carrier containing the computer program of example embodiment 10, wherein the carrier is one of an electronic signal, optical signal, radio signal, or computer readable storage medium.

A1. A communication system including a host computer comprising:
   processing circuitry configured to provide user data; and
   a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-7.

A2. The communication system of the previous embodiment further including the base station.

A3. The communication system of the previous two embodiments, further including the UE, wherein the UE is configured to communicate with the base station.

A4. The communication system of the previous three embodiments, wherein:
   the processing circuitry of the host computer is configured to execute a host application, thereby providing the user data; and
   the UE comprises processing circuitry configured to execute a client application associated with the host application.

A5. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of embodiments 1-7.

A6. The method of the previous embodiment, further comprising, at the base station, transmitting the user data.

A7. The method of the previous 2 embodiments, wherein the user data is provided at the host computer by executing a host application, the method further comprising, at the UE, executing a client application associated with the host application.

A8. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments 1-7.

A9. The communication system of the previous embodiment further including the base station.

A10. The communication system of the previous two embodiments, further including the UE, wherein the UE is configured to communicate with the base station.

A11. The communication system of the previous three embodiments, wherein:
   the processing circuitry of the host computer is configured to execute a host application; and
   the UE is further configured to execute a client application associated with the host application, thereby providing the user data to be received by the host computer.

A12. A method implemented in a communication system including a host computer, a base station and a user equipment (UE), the method comprising:
at the host computer, receiving, from the base station, user data originating from a transmission which the base station has received from the UE, wherein the base station performs any of the steps of any of embodiments 1-7.

A13. The method of the previous embodiment, further comprising at the base station, receiving the user data from the UE.

A14. The method of the previous 2 embodiments, further comprising at the base station, initiating a transmission of the received user data to the host computer.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method, in a first wireless relay node operating in a wireless communications network, the method comprising:
   obtaining for each of one or more other wireless relay nodes, information indicating a muting pattern for muting of synchronization signal blocks (SSBs) by the one or more other wireless relay nodes, the muting of the SSBs being performed based on the obtained information and an internal list of muting prioritization, wherein the internal list describes, for each time domain measurement window, measuring of each of one or more other wireless relay nodes associated with SSBs and corresponding muting attribute; and
   performing measurements of SSBs and muting of SSB transmissions based on the obtained information and the internal list;
   wherein obtaining the information comprises receiving the information for each of a plurality of the other wireless relay nodes from a centralized network function to build the internal list based on the obtained information, and
   wherein receiving the information from the centralized network function comprises receiving the information in a measurement request sent to the first wireless relay node.

2. The method of claim 1, wherein obtaining the information comprises receiving the information for at least one of the other wireless relay nodes from the respective wireless relay node.

3. The method of claim 2, wherein receiving the information from the respective wireless relay node comprises receiving the information in an SSB received from the respective wireless relay node.

4. The method of claim 1, wherein, for at least one other wireless relay node, the information indicating the muting pattern is specific to a cell served by the respective other wireless relay node.

5. The method of claim 1, wherein, for at least one other wireless relay node, the information indicating the muting pattern applies to multiple cells served by the respective other wireless relay node.

6. A wireless relay node comprising:
   transceiver circuitry; and
   processing circuitry operatively associated with the transceiver circuitry, wherein the processing circuitry is configured to:
   obtain, for each of one or more other wireless relay nodes, information indicating a muting pattern for muting of synchronization signal blocks (SSBs) by the one or more other wireless relay nodes, the muting of the SSBs being performed based on the obtained information and an internal list of muting prioritizations, wherein the internal list describes, for each time domain measurement window, measuring of each of one or more other wireless relay nodes associated with SSBs and corresponding muting attribute;
   perform measurements of SSBs and muting of SSB transmissions, using the transceiver circuitry, based on the obtained information and the internal list,
   obtain the information by receiving the information for each of a plurality of the other wireless relay nodes from a centralized network function to build the internal list based on the obtained information, and receive the information from the centralized network function by receiving the information in a measurement request sent to a first wireless relay node.

7. The wireless relay node of claim 6, wherein the processing circuitry is configured to obtain the information by receiving the information for at least one of the other wireless relay nodes from the respective wireless relay node.

8. The wireless relay node of claim 7, wherein the processing circuitry is configured to receive the information from the respective wireless relay node by receiving the information in an SSB received from the respective wireless relay node.

9. The wireless relay node of claim 6, wherein, for at least one other wireless relay node, the information indicating the muting pattern is specific to a cell served by the respective other wireless relay node.

10. The wireless relay node of claim 6, wherein, for at least one other wireless relay node, the information indicating the muting pattern applies to multiple cells served by the respective other wireless relay node.

11. A non-transitory computer readable medium comprising instructions for execution by processing circuitry of a wireless relay node, the instructions being configured to cause the processing circuitry of the wireless relay node to:
   obtain, for each of one or more other wireless relay nodes, information indicating a muting pattern for muting of synchronization signal blocks (SSBs) by the one or more other wireless relay nodes, the muting of the SSBs being performed based on the obtained information and an internal list of muting prioritization, wherein the internal list describes, for each time domain measurement window, measuring of each of one or more other wireless relay nodes associated with SSBs and corresponding muting attribute;
   perform measurements of SSBs and muting of SSB transmissions based on the obtained information and the internal list,
   obtain the information by receiving the information for each of a plurality of the other wireless relay nodes from a centralized network function to build the internal list based on the obtained information, and receive the information from the centralized network function by receiving the information in a measurement request sent to a first wireless relay node.

* * * * *